United States Patent
Davis

(10) Patent No.: US 6,189,147 B1
(45) Date of Patent: Feb. 13, 2001

(54) APPARATUS AND METHOD FOR AN INSTALLATION RECOVERY SYSTEM

(75) Inventor: Kenneth P. Davis, Brighton, CO (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/170,504

(22) Filed: Oct. 13, 1998

(51) Int. Cl.[7] .................................................. G06F 9/445
(52) U.S. Cl. ............................................ 717/11; 707/202
(58) Field of Search ..................... 717/3, 11; 707/200, 707/201, 202, 203, 204; 713/1, 2, 100

(56) References Cited

U.S. PATENT DOCUMENTS

| | | | |
|---|---|---|---|
| 5,768,566 | * 6/1998 | Harikrishnan et al. | 395/500 |
| 5,794,052 | * 8/1998 | Harding | 395/712 |
| 5,892,953 | * 4/1999 | Bhagria et al. | 395/712 |
| 6,006,035 | * 12/1999 | Nabahi | 395/712 |

OTHER PUBLICATIONS

No Author, "WIN 98: Why you need it" Windows Magazine, May 1998, pp 162–171.*

Ellerin, "The wonders and wizards of Windows installation utilities", Emedia Professional, Oct. 1997, pp 78–90.*

No Author, "Netware backup software diffusing the backup bomb", InfoWorld, Dec. 1995, pp 086.*

Feibus, "Small business server offers easy installation", InformationWeek, Oct. 1997, pp 94.*

Feibus, "Recovering from accidental file deletions", Open Systems Today, Mar. 1994, pp 60.*

"How to get Novell and Windows networks to interoperate", Computer Telephony, Jan. 1995, pp 26.*

* cited by examiner

Primary Examiner—Kakali Chaki

(57) ABSTRACT

Apparatus and method are provided for efficiently recovering from an interrupted installation procedure. The installation system creates a list of components to be installed in the installation procedure. The installation recovery system works in conjunction with the component list and current component pointer to identify which component was the last component successfully installed in the install procedure. In an instance where recovery is required, the installation recovery system identifies the last component installed and then restarts the install procedure from the point it was interrupted.

20 Claims, 5 Drawing Sheets

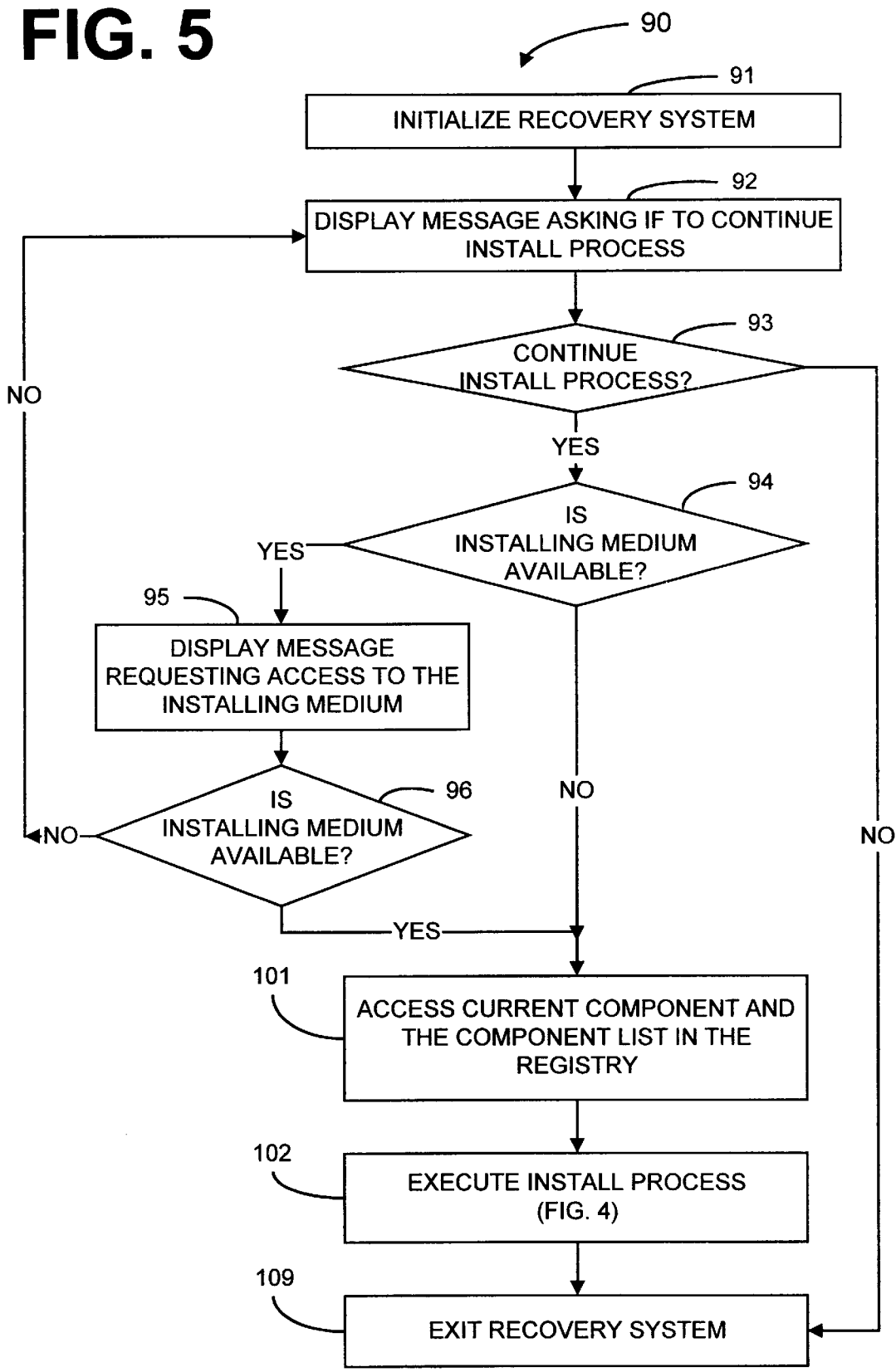

APPARATUS AND METHOD FOR AN INSTALLATION RECOVERY SYSTEM

BACKGROUND OF THE INVENTION

1. Field of the Invention

The present invention generally relates to software installation and, more particularly, is related to a system and method for efficiently recovering from an interrupted software installation on a computer system.

2. Description of Related Art

Currently, most software packages have a software installation program having a function to install another program on a computer system. The installation program might be used to guide a user through the complex procedure of setting up the application program for a particular combination of machine and accessories. Installation programs are necessary for copy protected applications which cannot be copied by normal system commands. Typically, they limit the number of copies that can be installed. Currently, if a user's machine is interrupted during the install process, the only alternative is for the user to delete the old components that were partially installed and restart the installation procedure from the beginning.

Heretofore, installation managers have lacked the ability to automatically recover an install process in the event of a crash without wasting time re-installing files that are already installed on the user system.

SUMMARY OF THE INVENTION

The present invention provides an apparatus and method for implementation of an installation recovery system for an install system. To achieve the advantages and novel features, the present invention is generally directed to an implementation of an installation recovery system for an install system that utilizes a list of components to be installed and a current component pointer. The current component pointer identifies which component was the last component successfully installed in the install process. In an instance where recovery is required, the installation recovery system identifies the last component installed and then restarts the install process from the point it was interrupted.

In an alternative embodiment, the component list (i.e., internal data structure) uses alternative means for component identification. The alternative component identification is done using some other symbols, letters, strings, encrypted strings, register keys, INI file sections, INI file values or the like. The use of alternative means for component identification provides additional flexibility and versatility for the identifying installed components.

In another alternative embodiment, the component list also uses other types of component list structures such as, registry keys, INI file sections, INI file values, encrypted strings, and the like. The use of other types of component list structures provides additional flexibility and versatility for identifying installed components.

In another alternative embodiment, the installation recovery system also provides the ability to allow the user to determine if the install system is to continue from the interrupted point. This provides additional control to the user during the install process.

In yet another alternative embodiment, the installation recovery system may allow the user to select which components in the component list are to be recovered during installation recovery. This provides additional flexibility and control for the user to identify and choose which selected program(s) are installed during the recovered install process.

In yet another alternative embodiment, the installation recovery system may permit the install system to indicate which components are mandatory for installation recovery. The indications are then detected by the installation recovery system to identify the components that should be recovered. This provides additional security to the user to ensure that mandatory components are installed.

In a further alternative embodiment, the component list (i.e., a temporary directory) constructed in the registry, is constructed in any directory that currently exists or in a new directory that gets created during installation recovery system execution. This provides additional flexibility and versatility for the install system to be implemented on a computer system utilizing any type of operating system.

Another alternative embodiment permits the install system to provide an autorun executable for the installation recovery system. An autorun executable is a program that is executed without user intervention. This provides additional robust and reliable operation for a user to ensure that the installation recovery system is performed in most circumstances.

In yet another alternative embodiment, the installation recovery system can launch recovery from the installation media used to store and transfer files when the application is installed. This provides additional flexibility and versatility to a software vendor to ensure the installation recovery system is available during a user's installation of the vendor's software.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description, serve to explain the principles of the invention. Moreover, in the drawings, like reference numerals designate corresponding parts throughout the several views. In the drawings:

FIG. 5 is a flow chart of the installation recovery system of the present invention, as shown in FIGS. 1 and 2.

DETAILED DESCRIPTION OF THE PREFERRED EMBODIMENT

Figure 1:
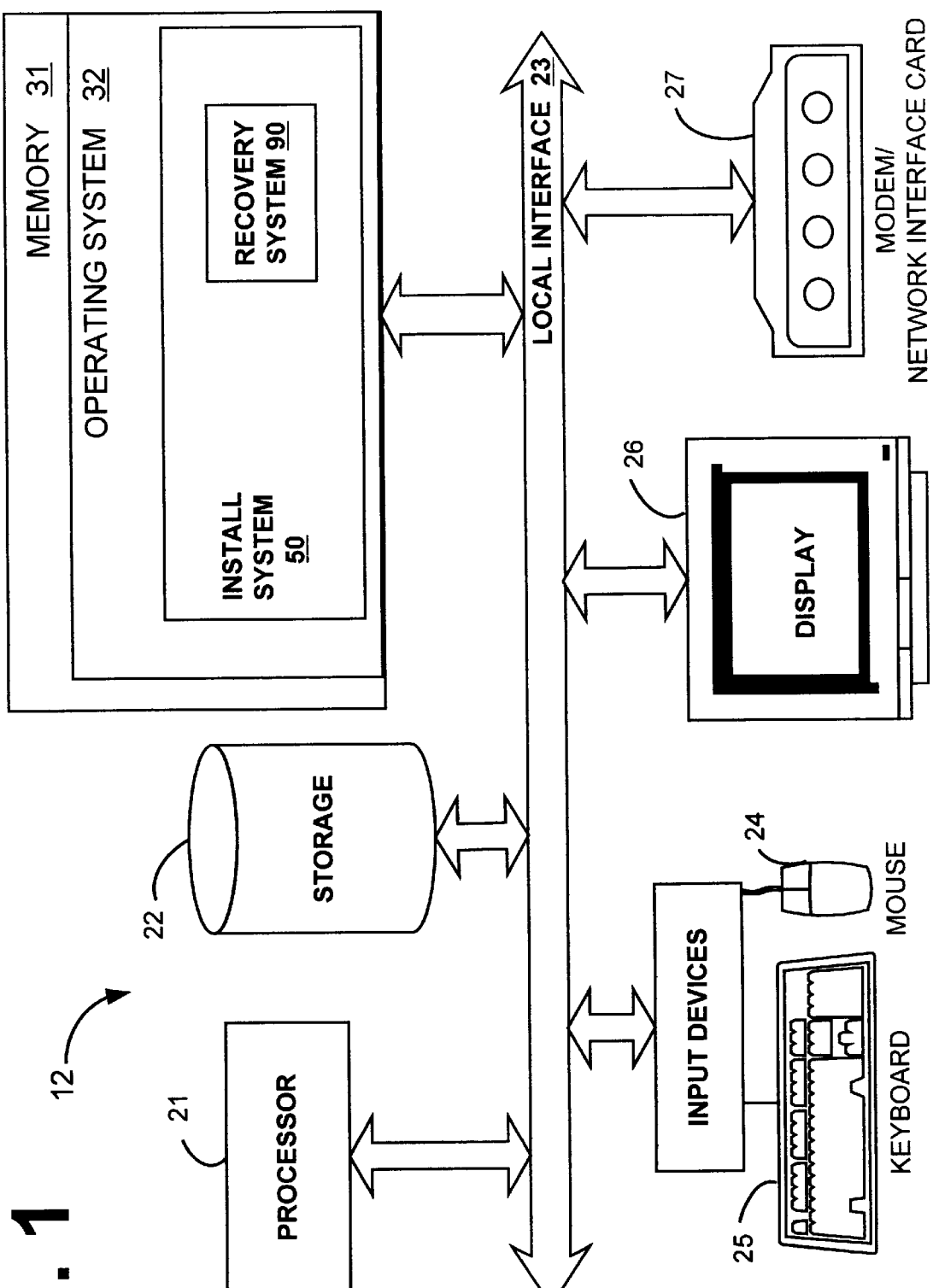
FIG. 1 is a diagram of the user system showing the installation system and installation recovery system utilized by the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

As illustrated in FIG. 1, computer system 12 today generally comprises a processor 21, a storage device(s) 22, and system memory 31 with an operating system 32. Both the storage device 22 and memory 31 include instructions that are executed by the processor 21. Storage device(s) 22 can be, for example, in any one or combination of the following: CD-ROM, disk, diskette, cartridge, cassette, ROM or the like. The processor 21 accepts data from memory 31 or storage device 22 over the local interface or bus 23. Direction from the user can be signaled by using an input device(s), for example, a mouse 24, keyboard 25, or the like. The action input and result output are displayed on the display terminal 26.

The first component of the present invention involves the install system 50. The install system 50 of the present invention can be implemented in hardware, software, firmware, or a combination thereof. In the preferred embodiment, the install system 50 is implemented in software or firmware that is stored in a memory and that is executed by a suitable instruction execution system. The install system 50 interacts with the processor 21, storage device 22, and the program residing in memory 31, to install the requested data and functionality requested by the client user from an installation medium such as, but not limited to, CD-ROM, disk, diskette, network connection 27, or the like. The install system 50 will be described hereafter in detail with regard to FIGS. 2, 3, and 4.

The installation recovery system 90 of the present invention can be implemented in hardware, software, firmware, or a combination thereof In the preferred embodiment, the install recovery system 90 is implemented in software or firmware that is stored in a memory and that is executed by a suitable instruction execution system. The installation recovery system 90 interacts with the install system 50, processor 21, storage device 22, and the program residing in memory 31, to recover the installation of software requested by the client user from the install system 50. The installation recovery system 90 will be described hereafter in detail with regard to FIG. 5.

Figure 2:
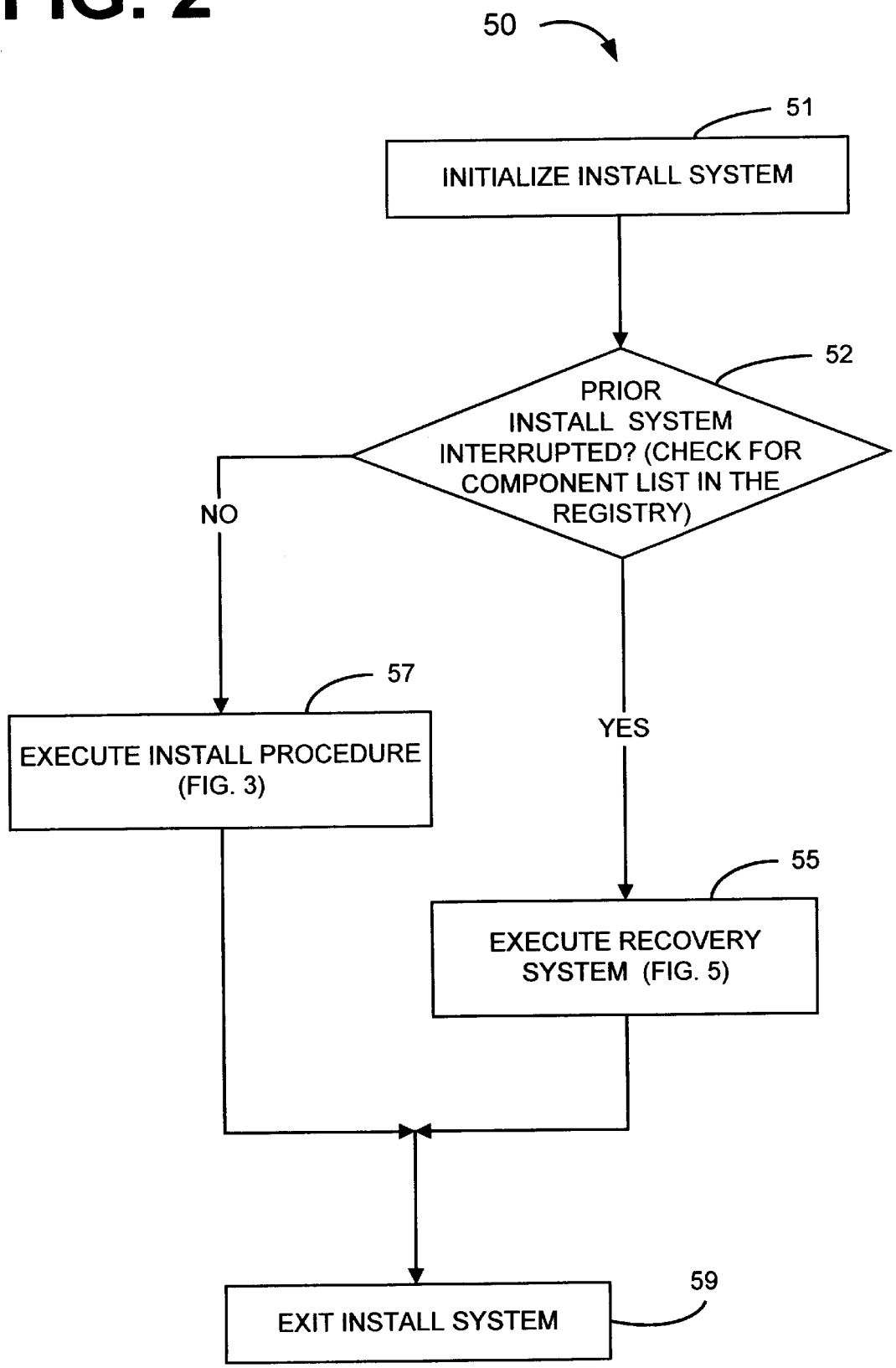
FIG. 2 is a flow chart of the install program system of the present invention, as shown in FIG. 1.

Illustrated in FIG. 2 is the flow chart for the install system 50. The flow chart of FIG. 2, as well as those flow charts in subsequent figures, represent the architecture, functionality, and operation of a possible implementation of the install system 50. In this regard, each block represents a module, segment, or portion of code, which comprises one or more executable instructions for implementing the specified logical function(s). It should also be noted that in some alternative implementations the functions noted in the blocks may occur out of order.

First, the install system 50 is initialized at step 51. Next, the install system 50 checks for a component list in the system registry at step 52. If no component list is found in the registry, then a prior install system 50 process was not interrupted. If the check at step 52 indicates that there is no component list in the registry and therefore no prior install system 50 process was interrupted, then the install system 50 executes the standard install procedure at step 57, discussed herein in further detail with regard to FIG. 3.

If the prior install system 50 process was interrupted, then the install system 50 executes the installation recovery system 90 at step 55, which is discussed in further detail with regard to FIG. 5.

Figure 3:
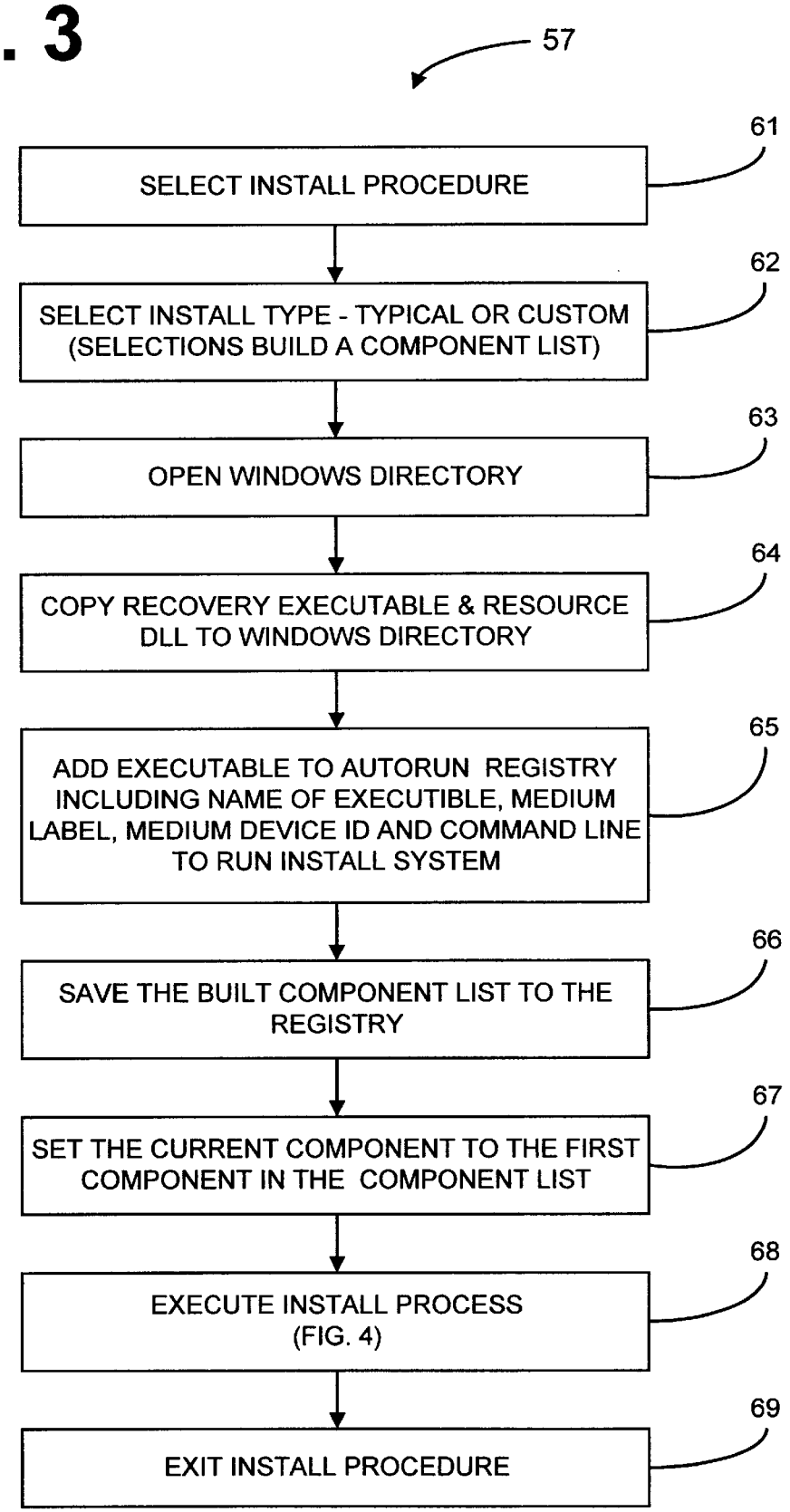
FIG. 3 is a flow chart of the install program procedure of the present invention, as shown in FIG. 2.

Illustrated in FIG. 3 is the installation procedure 57. The installation procedure 57 of the present invention can be implemented in hardware, software, firmware, or a combination thereof. In the preferred embodiment(s), the installation procedure 57 is implemented in software or firmware that is stored in a memory and that is executed by a suitable instruction execution system.

The installation procedure 57 is initialized at step 61. The installation procedure 57 requests the user to select the installation type (typical or custom installation) at step 62. Once the user has selected the installation type, a component list is constructed from an installation medium such as, but not limited to, CD-ROM, disk, diskette, network connection 27, or the like. If the installation type is typical, then a standard list of components to be installed is obtained from the installation medium. If a custom installation is selected, then the user is provided with a means to select the components desired for installation.

An example of a typical/custom installation procedure is described in the commonly assigned and copending U.S. patent application (HP Attorney Docket No. 10980744) entitled "Apparatus and Method for an Install System for Third Party Applications," Ser. No. 09/170,692 filed on Oct. 13 1998, herein incorporated by reference.

In an alternative embodiment, the component list (i.e., internal data structure) built at step 62 could use alternative means for component identification. The alternative component identification could be done using some other symbols, letters, strings, encrypted strings, register keys, INI file sections, and INI file values. The INI file in DOS and Windows applications is a file extension that identifies that the file is an initialization file. The INI file contains user preference and start-up information about application programs. Some operating systems make use of files that contain INI file extensions. These files have a specified format that allows for locating data quickly. The format of a typical Windows INI file is [Section 1] key 1=, key 2=, key 3=; [Section 2] key 1=, key 2=, key 3=. The name of Section 1, key 1 and key 2 are used as example names. The user can create the INI file that can define the actual names for the section items in the file. These sections allow the file to be broken down into specific section items. The key names allow specified values to be retrieved from a specified section. The data on the right hand side of the equal sign can be used as values, letters, text strings, encrypted strings, and the like. The use of alternative component identification provides additional flexibility and versatility for the install system 50 to be implemented on a computer system utilizing any type of operating system.

In another alternative embodiment, the component list built at step 62 could also use other types of component list structures. The component list structures built at 62 could be done using some other structures such as registry keys, INI file sections, INI file values, encrypted strings, and the like. The use of other types of component list structures provides additional flexibility and versatility for the install system 50 to be implemented on a computer system utilizing any type of operating system.

The installation procedure 57 opens the window directory at step 63 and copies the recovery executable code (not shown) and resource dynamic link library information (not shown) to the windows directory at step 64.

The recovery executable is added to the autorun registry (not shown) at step 65. The recovery executable includes the name of the executable, the installation medium label, the installation medium drive ID and the command line to run the recovery system 90.

The internal data structure built at step 62 is saved as a component list in the registry at step 66. The current component is set to the first component in the component list at step 67. The install process is executed at step 68, and is herein defined in further detail with regard to FIG. 4. The installation procedure 57 then exits at step 69.

Figure 4:
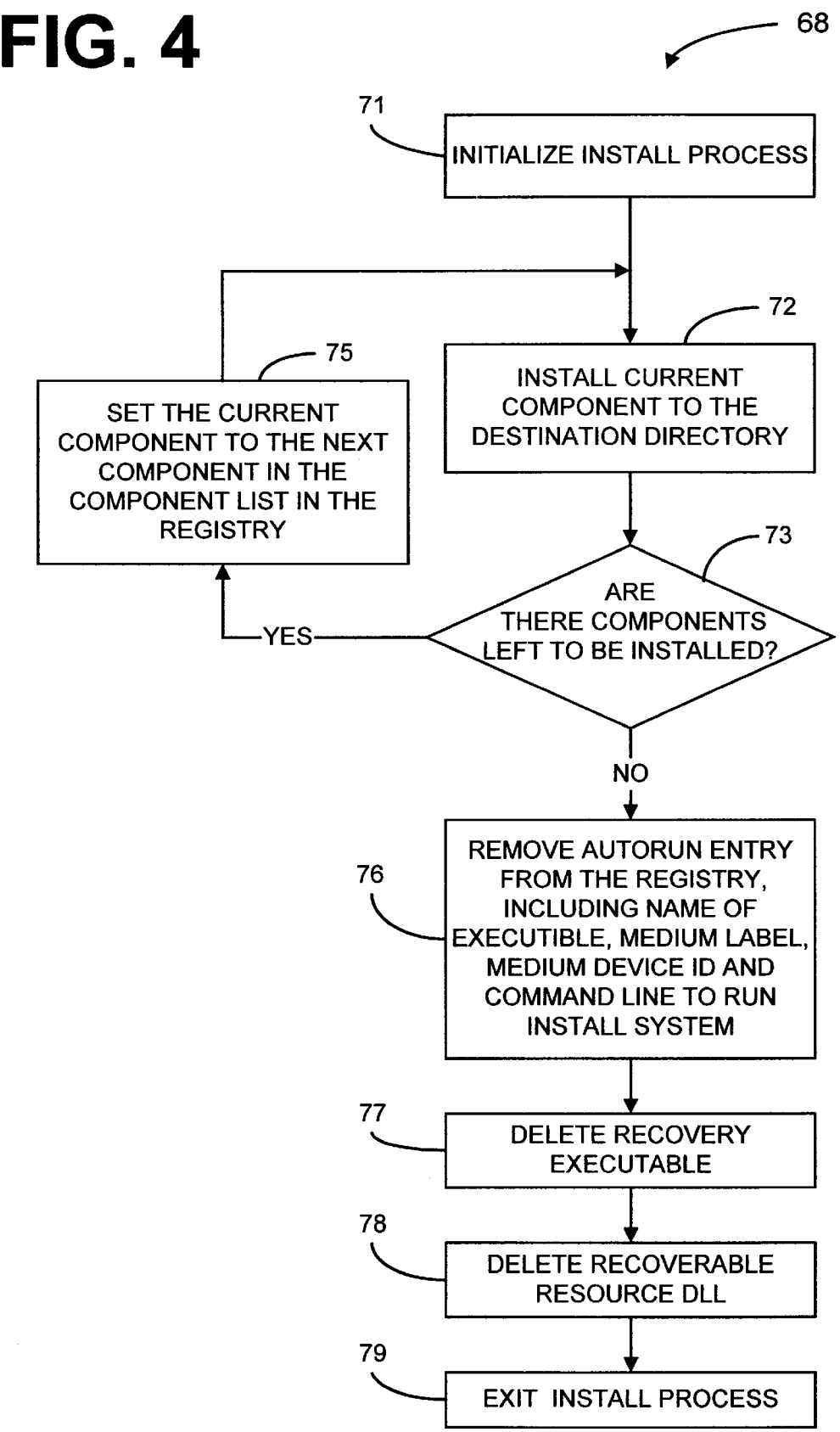
FIG. 4 is a flow chart of the install process of the present invention, as shown in FIG. 3.

Illustrated in FIG. 4 is the actual install process 68. The install process 68 is initialized at step 71. The install process 68 installs the component identified by the current component pointer, into the destination directory at step 72. The current component pointer is a variable that points to the component in the component list that is currently being installed by the install system 50. The install process 68 determines if there are more components left to be installed at step 73. This check is done by accessing a component list to see if more components remain and need to be installed. This component list was constructed using data obtained from the registry at step 62 through step 67 (FIG. 3). If there are more components to be installed, then the install process 68 sets the current component pointer to be pointing to the next component in the internal data structure, at step 75. The install process 68 loops to step 72 and repeats the installation of the component identified on the current component pointer to the destination directory.

If the check of components left to be installed is negative at step 73, the install process 68 removes the autorun entry from the registry, including the name of the executable, the installation medium label, the installation medium ID, and the command line to run the install process 68 at step 76. The install process 68 deletes the recovery executable at step 77 and the recoverable resource data link library at step 78 to prevent confusion in later installations.

After the install process 68 is complete and the recoverable resource data link library is deleted at step 78, the install system 50 may execute a link manager (i.e., shortcut link creation), prior to the entire install process 68 being exited at step 79. An example of a link manager procedure is described in the commonly assigned and copending U.S. patent application (HP Attorney Docket No. 10980743-1) entitled "Apparatus and Method for Shortcut Link Creation System in a Computer System," Ser. No. 09/170,507,, filed on Oct. 13 1998, herein incorporated by reference.

Illustrated in FIG. 5 is the installation recovery system 90 of the present invention. The installation recovery system 90 is initialized at step 91. The installation recovery system 90 displays a message to the user asking the user if the install process 68 is to continue from its interrupted point, at step 92. This installation recovery system 90 next determines if the user desires to continue the install process 68 at step 93. If the user does not desire to continue the install process 68, the installation recovery system 90 is exited at step 109.

If the user desires to continue with the installation recovery system 90 process, then the installation recovery system 90 determines if the installation medium (i.e., CD-ROM, disk, diskette, network connection, or the like) is available at step 94. If the installation medium (i.e., CD-ROM, disk, diskette, network connection or the like) has been made unavailable, the installation recovery system 90 displays a message requesting the user to make the installation medium available (i.e., CD-ROM, disk, diskette, network connection, or the like) at step 95. The installation recovery system 90 next determines if the installation medium (i.e., CD-ROM, disk, diskette, network connection or the like) has been made available by the user at step 96.

If the installation medium (i.e., CD-ROM, disk, diskette, network connection, or the like) has not been made available to the recovery system 90 at step 96, then the installation recovery system 90 loops to step 92 and displays a message asking the user if the user wishes to continue the install process 68.

If the installation medium (i.e., CD-ROM, disk, diskette, network connection, or the like) has been made available to access, then the installation recovery system 90 accesses the current component using the current component pointer and the component list in the registry at step 101. The installation recovery system 90 executes the install process 68 at step 102. The install process 68 starts with the current component accessed in step 101, and executes the install process 68 as described with regard to FIG. 4. Upon completion of the install process 68, the installation recovery system 90 is exited at step 109.

In an alternative embodiment, the installation recovery system 90 may allow the user to select which components in the component list are to be recovered. This process could include any suitable selection system in an install system 50, for example, but not limited to, the custom installation procedure defined in the commonly assigned and copending U.S. application (HP Attorney Docket No. 10980744-1 entitled "Apparatus and Method for an Install System for Third Party Applications," Ser. No. 08/170,692 filed on Oct. 13, 1998, herein incorporated by reference.

Yet another alternative embodiment may permit the install system 50 to set flags on components that are mandatory for installation recovery. The set flags would then be detected by the installation recovery system 90 to identify the components that must be recovered. These component flags could be included in the INI files, the files present and the registry settings.

In a further alternative embodiment, the temporary directory being constructed in the registry could be constructed in any directory that currently exists or in a new directory that gets created by the installation recovery system 90. This provides additional flexibility and versatility for the install and recovery systems to be implemented on a computer system utilizing any type of operating system.

Another alternative embodiment permits the install system 50 to provide an autorun executable or installation recovery service that will launch the recovery executable for the installation recovery system 90 from the installation CD-ROM or any other medium used to store and transfer files when the application is installed. If the CD or storage installation medium is a medium in which the computer system 12 can be utilized during system start up, then the installation recovery system 90 can be included as a temporary instruction in the computer system 12 initialization process any time.

The installation recovery system 90, comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by, or in connection with, the instruction execution system, apparatus, or device.

The computer readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured via, for instance, optical scanning of the paper or other medium, then compiled, interpreted, or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A software installation recovery apparatus on a computer system, said installation recovery apparatus comprising:
   a means for providing a list of a plurality of software components to be installed;
   a means for installing said plurality of software components on said list of said plurality of software components on said computer system; and
   a means for recovering said installing means after an interruption by identifying a last of said plurality of software components installed, and by restarting said installing means from said last of said plurality of software components installed.

2. The apparatus of claim 1, wherein said recovering means further comprises:
   means for allowing a user to indicate if said installation is to be restarted.

3. The apparatus of claim 1, wherein said recovering means further comprises:
   means for identifying if a component is mandatory for installation recovery.

4. The apparatus of claim 1, wherein said recovering means further comprises:
   a means for allowing a user to select which components on said list of said plurality of software components are to be recovered by said recovering means for installation by said installation means.

5. The apparatus of claim 1, wherein said providing said list of said plurality of software components means further comprises:
   a means for accessing said list of said plurality of software components in a predetermined location.

6. The apparatus of claim 1, wherein said recovering means further comprises:
   a means for providing said recovery means as an autorun executable.

7. A method for use in multiprocessor memory apparatus, the method comprising the steps of:
   providing a list of a plurality of software components to be installed;
   installing said plurality of software components on said list of said plurality of software components in a computer system; and
   recovering of said installation of said plurality of software components after an interruption.

8. The method of claim 7, wherein the recovering of said installation step further comprises the steps of:
   identifying a last of said plurality of software components installed; and
   restarting said installation from said last of said plurality of software components installed.

9. The method of claim 7, wherein the recovering of said installation step further comprises the step of:
   allowing a user to indicate if said installation is to be restarted.

10. The method of claim 7, wherein the recovering of said installation step further comprises the step of:
    identifying if a component is mandatory for installation recovery.

11. The method of claim 7, wherein the recovering of said installation step further comprises the step of:
    allowing a user to select which components on said list of said plurality of software components are to be recovered for said installation.

12. The method of claim 7, wherein the recovering of said installation step further comprises the step of:
    accessing said list of said plurality of software components in a predetermined location.

13. The method of claim 7, wherein the recovering of said installation step further comprises the step of:
    providing said recovery means as an autorun executable file.

14. A software installation recovery apparatus in a computer system, said installation recovery apparatus comprising:
    logic configured to provide a list of a plurality of software components to be installed;
    logic configured to install said plurality of software components on said list of said plurality of software components in a computer system; and
    logic configured to recover said installation of said plurality of software components after an interruption.

15. The apparatus of claim 14, further comprising:
    logic configured to identify a last of said plurality of software components installed; and
    logic configured to restart said installation from said last of said plurality of software components installed.

16. The apparatus of claim 14, further comprising:
    logic configured to allow a user to indicate if said installation is to be restarted.

17. The apparatus of claim 14, further comprising:
    logic configured to identify if a component is mandatory for said installation.

18. The apparatus of claim 14, further comprising:
    logic configured to allowing a user to select which components on said list of said plurality of software components are to be recovered for said installation.

19. The apparatus of claim 14, further comprising:
    logic configured to access said list of said plurality of software components in a predetermined storage location.

20. The apparatus of claim 14, further comprising:
    logic configured to provide said installation recovery as an autorun executable file.

* * * * *